(12) United States Patent
Talbot et al.

(10) Patent No.: US 6,602,407 B2
(45) Date of Patent: Aug. 5, 2003

(54) ORIENTED STRUCTURE FOR TREATING A FLUID

(75) Inventors: Pierre Talbot, Notre-Dame du Portage (CA); Roger Lacasse, Notre-Dame du Portage (CA); Yves Arcand, Notre-Dame du Portage (CA); Olivier Vermeersch, St-Hyacinthe (CA); Jacek Mlynarek, Montréal ouest (CA)

(73) Assignee: Premier Tech 2000 Ltee, Quebec (CA)

( * ) Notice: Subject to any disclaimer, the term of this patent is extended or adjusted under 35 U.S.C. 154(b) by 0 days.

(21) Appl. No.: 09/904,817

(22) Filed: Jul. 13, 2001

(65) Prior Publication Data

US 2002/0023871 A1 Feb. 28, 2002

(30) Foreign Application Priority Data

Jul. 13, 2000 (CA) .............................................. 2314545

(51) Int. Cl.$^7$ .................................................. C02F 3/04
(52) U.S. Cl. ...................... 210/150; 210/266; 210/492; 210/497.1; 210/505; 210/615; 264/258
(58) Field of Search ................................ 210/150, 151, 210/266, 492, 497.1, 503, 505, 615; 264/258

(56) References Cited

U.S. PATENT DOCUMENTS

| | | | |
|---|---|---|---|
| 1,872,430 A | 8/1932 | Ericson | |
| 3,827,562 A | 8/1974 | Esmond | 210/304 |
| 3,899,424 A | * 8/1975 | Lake | 210/497.1 |
| 4,101,423 A | 7/1978 | Merrill et al. | 210/490 |
| 4,465,594 A | 8/1984 | Laak | 210/630 |
| 4,490,072 A | 12/1984 | Glasser | 405/45 |
| 4,574,541 A | 3/1986 | Raidt et al. | 52/169.5 |
| 4,620,917 A | 11/1986 | Nozawa et al. | |
| 4,639,165 A | 1/1987 | Flecknoe-Brown | 405/45 |
| 4,708,792 A | 11/1987 | Takarabe et al. | 210/150 |
| 4,745,716 A | 5/1988 | Kuypers | 52/169.5 |
| 4,815,892 A | 3/1989 | Martin | 405/45 |
| 4,877,527 A | * 10/1989 | Brownell | 210/497.1 |
| 4,880,333 A | 11/1989 | Glasser | 405/43 |
| 4,908,128 A | * 3/1990 | Chiba | 210/150 |
| 4,917,536 A | 4/1990 | Glasser | 405/45 |
| 4,925,342 A | 5/1990 | Hendy | 405/45 |
| 4,983,068 A | 1/1991 | Kozak | 405/36 |
| 5,084,164 A | 1/1992 | Del Rosario | 210/94 |
| 5,096,591 A | 3/1992 | Benn | 210/651 |
| 5,114,582 A | 5/1992 | Sandstrom | 210/321.74 |
| 5,160,039 A | * 11/1992 | Colburn | 210/150 |
| 5,232,429 A | 8/1993 | Cizek | 493/299 |
| 5,273,818 A | 12/1993 | Kim | 428/288 |
| 5,348,654 A | 9/1994 | Fischer | 210/615 |
| 5,492,635 A | 2/1996 | Ball | 210/802 |

(List continued on next page.)

FOREIGN PATENT DOCUMENTS

| | | |
|---|---|---|
| CA | 2139554 | 2/1995 |
| CA | 2009752 | 9/1998 |
| CA | 2171279 | 11/1999 |
| FR | 2 745 195 | 2/1996 |

*Primary Examiner*—Christopher Upton
(74) *Attorney, Agent, or Firm*—St. Onge Steward Johnston & Reens LLC (57) ABSTRACT

An oriented structure for treating a fluid, comprising an inlet end for receiving a fluid to be treated and an outlet end opposite the inlet end and from which a treated fluid is discharged, the fluid being allowed to flow into the structure from the inlet end to the outlet end defining a flowing direction. The oriented structure comprises a juxtaposition of layers of porous material having a different porosity, each layer spanning from the inlet end to the outlet end of the structure whereby in use the layers are oriented generally parallel to the flowing direction of the fluid. The oriented structure is designed so to better control the different biological and physical phenomena related to the accumulation or exchange processes taking place in the structure.

20 Claims, 9 Drawing Sheets

U.S. PATENT DOCUMENTS

| | | | |
|---|---|---|---|
| 5,609,947 A | 3/1997 | Kamel | 428/212 |
| 5,624,204 A | 4/1997 | Dorsemaine | 405/52 |
| 5,776,567 A | 7/1998 | Schilling | 428/34.5 |
| 5,827,430 A | 10/1998 | Perry, Jr. | 210/497.01 |
| 5,980,740 A * | 11/1999 | Harms et al. | 210/497.1 |
| 5,980,748 A | 11/1999 | Auger | 210/631 |
| 6,048,131 A | 4/2000 | Laak | 405/43 |
| 6,077,376 A | 6/2000 | Katraro | 156/195 |
| 6,100,081 A * | 8/2000 | Buelna | 210/150 |
| 6,283,309 B1 * | 9/2001 | Koers | 210/615 |

* cited by examiner

ORIENTED STRUCTURE FOR TREATING A FLUID

FIELD OF INVENTION

The present invention relates generally to the treatment of a fluid. More particularly, it concerns an oriented structure for treating a fluid.

PRIOR ART DESCRIPTION

The use of biofilters or filters for water treatment and air treatment has been known for a long time. Already known in the art of water treatment, there is a reactor filled with porous material allowing water to flow either upwardly through the porous material in a submerging mode or downwardly in a percolating or submerging mode. In a submerging mode, the system consists of a solid-liquid bi-phase system while in a percolating mode, the system consists of a solid-liquid-gas tri-phase system. Depending on the goals of the treatment, the solid phase can be used for retaining particulate material, fixing micro-organisms and settling chemical reactions. The following review of the prior art is more specifically directed to filtering systems using percolating and tri-phase biofilters for treating waste water. However, some of the described phenomena can yet be applied to bi-phase reactors in a non-exclusive manner.

Equation 1 shows the relation existing between the three phases (solid, liquid, gas) in terms of hold-up corresponding to a fraction of the total volume of the reactor occupied by each of these phases.

$$1 = \epsilon_s + \epsilon_L + \epsilon_g \quad (1)$$

The solid hold-up, or $\epsilon_s$, can be subdivided in three components.

$$\epsilon_s = \epsilon_s^m + \epsilon_s^b + \epsilon_s^p \quad (2)$$

where $\epsilon_s^m$ corresponds to the fraction of solid volume occupied by the filtering material, $\epsilon_s^b$ corresponds to the fraction of solid volume occupied by the biomass and $\epsilon_s^p$ corresponds to the fraction of volume occupied by the particulate materials retained in the trickling bed.

The liquid hold-up, or $\epsilon_L$, can be subdivided in two components:

$$\epsilon_L = \epsilon_L^s + \epsilon_L^d \quad (3)$$

where $\epsilon_L^d$ corresponds to the fraction of liquid volume occupied by the liquid in movement or flowing down and $\epsilon_L^s$ corresponds to the fraction of liquid volume occupied by the static liquid held up in the trickling bed.

In the same way, gaseous hold-up, or $\epsilon_g$ can be subdivided in two components, that is a static component ($\epsilon_g^s$) and a dynamic component ($\epsilon_g^d$):

$$\epsilon_g = \epsilon_g^s + \epsilon_g^d \quad (4)$$

Taking as a reference the simple percolation sand filter, a very widespread technology (described for example in WO9700770 corresponding to CA 2,247,519, FR 2,745,195 in the name of Eparco), one can observe, with time, a clogging phenomena in the upper part of the trickling bed, caused by the accumulation of neo-formed biomass ($\epsilon_s^b$) and of particulate materials ($\epsilon_s^p$). This clogging phenomena in the upper part limits the flow of gaseous fluids and liquids (increase of $\epsilon_s$ to the detriment of $\epsilon_L$ and $\epsilon_g$). This decrease of gaseous fluids flowing towards the bottom can cause, in the gaseous hold-up ($\epsilon_g$) of the trickling bed located under the upper part, a limitation in oxygen. Such limitation can cause a slowing-down, even a complete stop of the oxidation reactions taking place in this part of the trickling bed. On its side, the limitation of the liquid flow on the surface of the bed causes a reduction of the hydraulic conductivity of the trickling bed which in turn can cause a decrease in the water volume than can be treated in a given time.

On the other hand, the operation of the reactor in a percolating mode can have the effect of increasing the liquid hold-up ($\epsilon_L$) in the lower part of the trickling bed, such increase resulting from a capillary phenomenon. The proportion of the static ($\epsilon_L^s$) and dynamic ($\epsilon_L^d$) fractions of the liquid hold-up ($\epsilon_L$) in this part of the bed can vary depending on whether the reactor is fed or not. This increase in the liquid hold-up ($\epsilon_L$) causes a reduction of the gaseous hold-up ($\epsilon_g$) in the lower part of the trickling bed, thereby limiting the gaseous exchange with the part located above the lower part. In turn, this can cause in the upper part, in the gaseous hold-up ($\epsilon_g$) of the trickling bed, a limitation in oxygen. This limitation can also lead to a slowing-down, even a complete stop, of the oxidation reactions taking place in this zone.

Finally, resulting from the water energy dissipated, many filtering materials operated in percolation mode undergo a compaction effect which leads to a decrease of the gaseous hold-up ($\epsilon_g$).

To increase the efficiency in terms of the oxidation capacity or the lifetime of trickling biofilters, different strategies, used alone or in combination (sometimes with contrary effects) have been adopted until today. Most of the times, these strategies involve the use of bulk and non-oriented materials.

Vertical Spreading of the Clogging Zone

Good gaseous and liquid flows towards the bottom (reduction of $\epsilon_s$) of the trickling bed can be maintained by vertically spreading the clogging zone appearing in the upper portion of the trickling filter. One solution to reach this goal is to recirculate a portion of the final effluent of the trickling bed into the trickling bed. Such recirculation leads to a dilution and an increase of the interstitial liquid velocity. This practice is however limited by the hydraulic loading capacity of the filtering material and by the fact that the increase of the superficial liquid velocity leads to an increase of the liquid hold-up ($\epsilon_L^d$) to the detriment of the gaseous hold-up ($\epsilon_g$). Such limitation has to be compensated in some cases by the use of a mechanically forced aeration provided by a fan or compressor. Moreover, such operation often implies using expensive pumps and valves.

The vertical Spreading of the clogging zone can also be increased by adjusting or changing different factors related to the porosity and porometry of the filter structure. To do so, one can mix more or less homogeneously components of different granulometry so as to obtain a structure with a larger and more extended porometry, as in Canadian patent no. 2,009,752. Others choose a structure comprising elements having an important percentage of empty voids interconnected inside and between each element. Polyurethane bodies are often used for this type of filter structure with two levels of porosity, as for example in Canadian patent application no. 2,139,554. These modifications are limited by the manufacturing or installation costs of the filtering medium and/or by the loss of efficiency caused by the reduction of the residence time of the liquid to be treated in the reactor (reduction of $\epsilon_L$).

Finally, it is possible to increase the spreading of the clogging zone while at the same time keeping a good purification capacity, and that, by changing the porometry of the filter structure and by introducing unit separators therein for providing a hydraulic discontinuity at different levels. The superimposition of distinct layers induces an upward capillary flow at those different levels, thereby allowing an increase in liquid hold-up ($\epsilon_L$) and, at the same time, an increase in the residence time of the liquid to be treated; and that, despite a more open porometry (Canadian patent no. 2,171,279). However, the spreading of the clogging zone which results from an increase of the liquid hold-up ($\epsilon_L$) by a hydraulic failure is obtained to the detriment of the gaseous hold-up ($\epsilon_g$). This situation could require the use of a mechanically forced aeration or the frequent replacement of the filter structure.

Other examples of prior art filtration systems are given in U.S. Pat. Nos. 4,101,423; 4,490,072; 4,745,716; 4,574,541; 4,639,165; 4,917,536; 4,815,892; 4,925,342; 4,983,068; 5,114,582; 5,232,429; 5,273,818; 5,5,624,204; 5,776,567; 5,827,430; 5,980,748; 6,048,131; 6,077,376; 4,880,333; 5,609,947; 5,096,591; 4,465,594; CA2,009752; CA2,139, 554; and CA2,171,279.

SUMMARY OF THE INVENTION

An object of the present invention is to provide an improved structure for the treatment of fluids.

Another object is to provide a structure aiming to better control the different biological and physical phenomena related to the accumulation or exchange processes taking place in the structure.

More particularly, the present invention provides an oriented structure for treating a fluid, the structure comprising an inlet end for receiving a fluid to be treated and an outlet end opposite the inlet end and from which a treated fluid is discharged, the fluid being allowed to flow into the structure from the inlet end to the outlet end defining a flowing direction. The oriented structure also comprises a juxtaposition of layers of porous material having a different porosity, each layer spanning from the inlet end to the outlet end of the structure whereby in use the layers are oriented generally parallel to the flowing direction of the fluid. The structure is characterized in that the juxtaposition of layers comprises layers of a first material having a first porosity chosen so as to create a zone of dynamic hold-up of the fluid alternating with layers of a second material having a second porosity chosen so as to create a zone of static hold-up of the fluid, thereby promoting internal exchanges of fluid between the zone of dynamic hold-up and the zone of static hold-up.

One understands that the treatment of a fluid encompasses the filtration as well as the biofiltration of a fluid. It can also encompass the treatment by adsorption and/or absorption according to the type of material used.

The fluid that can be treated with a structure according to the present invention can be a liquid or a gas, more preferably it is a liquid and most preferably it is waste water By juxtaposition of layers, one understands the alternation of layers as well as the inclusion of different layers of materials as it will be more fully described hereinafter.

The juxtaposition of the materials with different porosity can be done vertically, horizontally or obliquely.

According to another aspect, the present invention also provides an oriented structure for treating a liquid, the structure comprising:

a top side opposite a bottom side;

an inlet in the top side for receiving a liquid to be treated and an outlet in the bottom side from which a treated liquid is discharged, the liquid being allowed to flow into the structure from the inlet to the outlet end defining a flowing direction;

a vertical juxtaposition of layers of fiber textile alternating with layers of peat, each layer spanning from the top side to the bottom side of the structure whereby in use the layers are oriented generally parallel to the flowing direction of the liquid.

According to another aspect, the invention provides a reactor for treating a liquid, the reactor comprising:

a chamber with an upper portion and a lower portion;

a liquid inlet in the upper portion for introducing in the chamber a liquid to be treated and a liquid outlet in the lower portion for discharging from the chamber a treated liquid; and at least one oriented structure as defined above mounted within the chamber, each layer of the at least one oriented structure spanning generally vertically within the chamber.

According to a still further aspect, the invention provides a method for manufacturing an oriented structure as defined above, comprising the steps of:

a) providing two mats of a first porous material having a porosity chosen so as to create a zone of dynamic hold-up of the fluid; and a second porous material made of a particulate material having a porosity chosen so as to create a static hold-up of the fluid;

b) forming a multilayer structure by covering one of said two mats with a layer of the second material and covering the layer of the second material with the other one of said two mats; and c) rolling up the multilayer structure.

BRIEF DESCRIPTION OF THE DRAWINGS

The objects and advantages of the invention will become more apparent upon reading the detailed description and upon referring to the drawings in which.

The invention will be described in conjunction with example embodiments. It will be understood that it is not intended to limit the scope of the invention to such embodiments. On the contrary, it is intended to cover all alternatives, modifications and equivalents as may be included as defined by the appended claims.

DESCRIPTION OF PREFERRED EMBODIMENTS

In the following description, similar features in the drawings have been given similar reference numerals and in order to weight down the figures, some elements are not referred to in some figures if they were already identified in a precedent figure.

Referring to either one of FIGS. 1 to 6, the oriented structure (10) generally comprises an inlet end (12) for receiving a liquid to be filtered and an outlet end (14) opposite the inlet end (12) and from which a filtered liquid is discharged. The liquid is allowed to flow into the structure (10) from the inlet end (12) to the outlet end (14) defining a flowing direction. The structure (10) also comprises a juxtaposition of layers (16, 18) of porous material having a different porosity, each layer (16, 18) spanning from the inlet end (12) to the outlet end (14) of the structure (10) whereby the layers (16, 18) are substantially parallel to the flowing direction of the liquid in the structure (10).

Figure 1A:
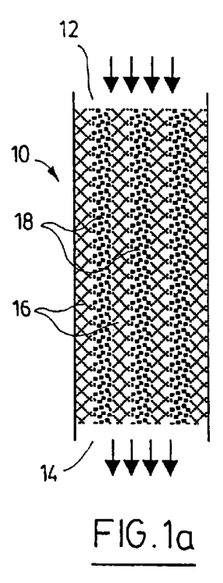
FIG. 1a) is a schematic side view of an oriented structure according to a preferred embodiment of the invention, the arrows indicating the flow direction of the liquid when the structure is used in a percolation mode.
Figure 1B:
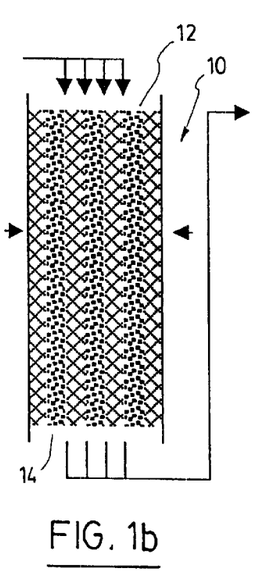
FIG. 1b) is the oriented structure of FIG. 1a), showing with the arrows, the flow direction of the liquid when the structure is used in a partial or complete submerging mode and is fed vertically from top to bottom.
Figure 1C:
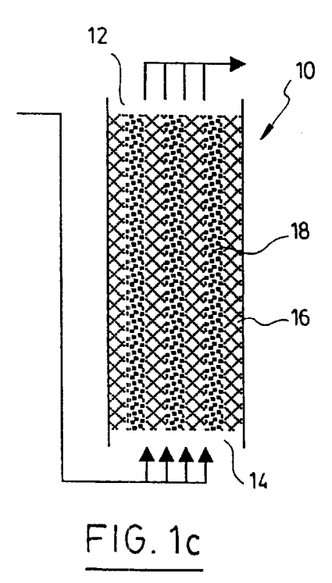
FIG. 1c) is the oriented structure of FIGS. 1a) and 1c), showing with the arrows, the flow direction of the liquid when the structure is used in a submerging mode and is fed vertically from bottom to top.
Figure 2:
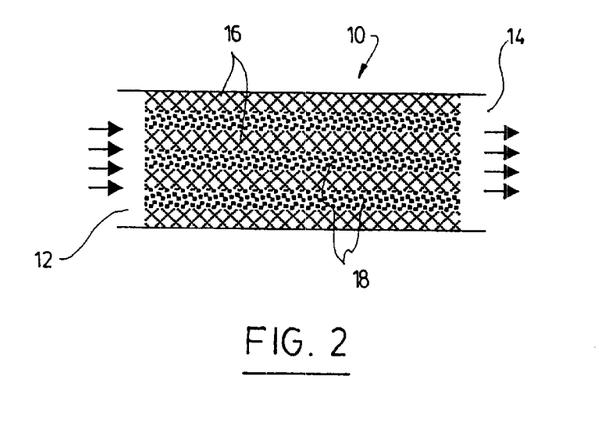
FIG. 2 is a schematic view an oriented structure according to another preferred embodiment of the invention which comprises a superimposition of layers of porous material, the structure being fed horizontally.

The present invention thus concerns an oriented structure (10) for treating a fluid, preferably a liquid made by the alternation or inclusion, in a vertical, horizontal or intermediate plan, of materials of different porosities, fed vertically or horizontally. As an example for treating a liquid, in a complete or partial submerging mode, an oriented structure (10) comprising a superimposition of layers (16, 18) should be fed horizontally as shown in FIG. 2. While an oriented structure (10) comprising a vertical juxtaposition of layers (16, 18) should be fed vertically from bottom to top, when used in a submerging mode, as in FIG. 1c), or from top to bottom, in a percolating or partial or complete submerging mode, as shown respectively in FIGS. 1a) and 1b). Thus, in an oriented structure according to the invention (10), the alternation of materials having a different porosity creates different zones, identified as zones 1 and 2, in FIG. 3, which favour a dynamic hold-up of the fluids ($\epsilon_L^d$ and $\epsilon_g^d$) in zone 1, and a static hold-up of the same fluids ($\epsilon_L^s$ and $\epsilon_g^s$), in zone 2. By varying the thickness, the porometry and the porosity of the porous materials used, as well as the fluid velocity, it is possible to better control the different biological and physical phenomena related to the accumulation or exchange processes taking place in the structure (10). One will note that this type of filtration or biofiltration structure can be used at different levels in a treatment process, it can be used as a secondary treatment as well as a tertiary treatment. Also, an operation strategy based on the recirculation of a fraction of the treated effluent can be considered with this type of treatment.

Figure 3:
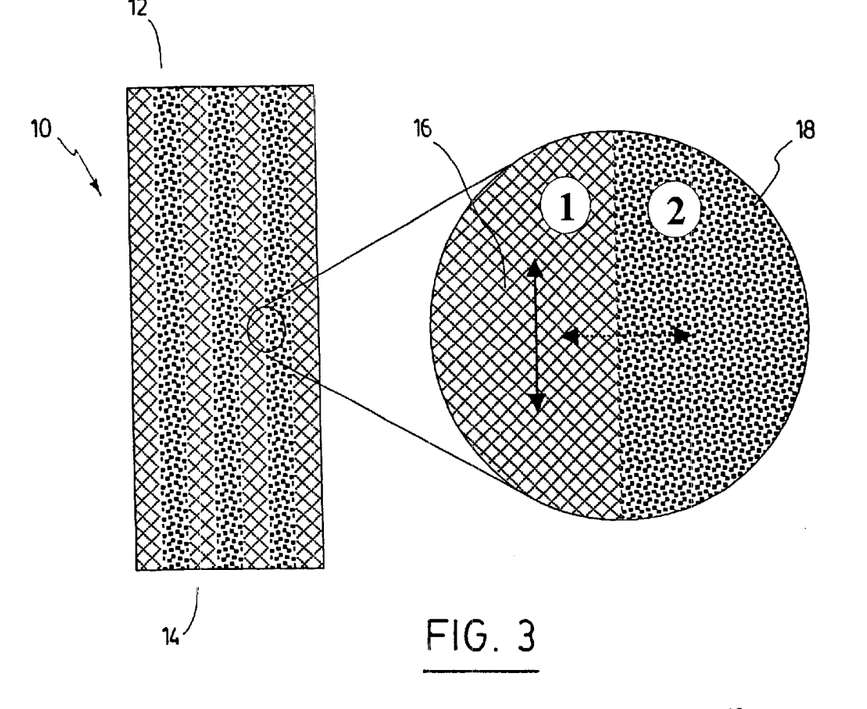
FIG. 3 is another view of the oriented structure of FIGS. 1a) to 1c) with a portion shown in an enlarged circle taken at the junction between two layers of porous material, and wherein arrows had been added to show the internal exchange direction between two layers.
Figure 4:
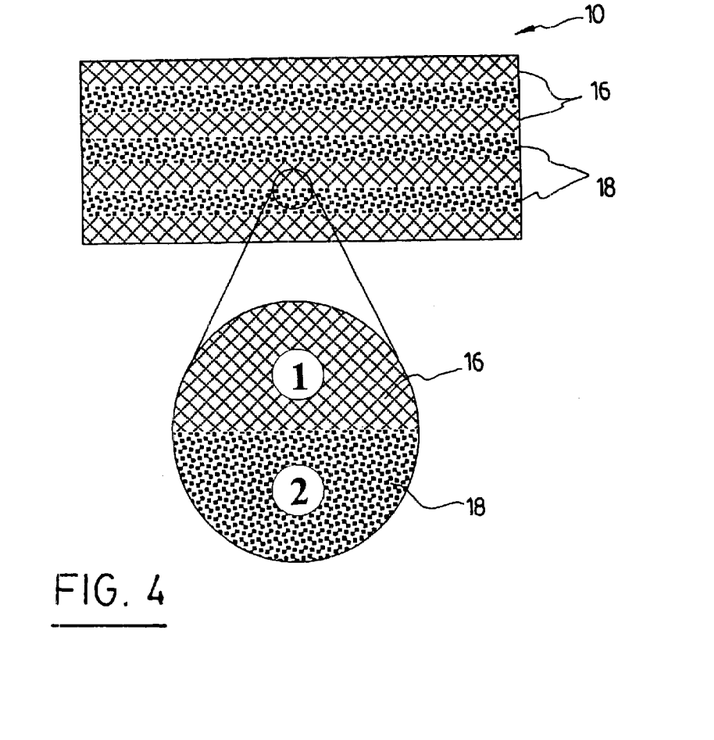
FIG. 4 is another view of the oriented structure of FIG. 2 with a portion shown in an enlarged circle taken at the junction between two layers of porous material.

Still referring to FIG. 3, on one hand, the exchange between the zones dominated by the dynamic hold-up of a fluid and those dominated by the static hold-up of the same fluid are facilitated when the velocity of the fluid in the dynamic zone (1) is less than the transfer velocity establishing between the dynamic zones (1) and the static zones (2). In such conditions, a dissolved element contained in a fluid flowing in the dynamic zone (1) can reach the fluid retained in the static zone (2) and react with the elements present in the static zone (2). Such phenomenon may allow an exploitation, for example, of the adsorption properties of materials with a low granulometry and thus an elevated specific surface in the static zone (2), while insuring a permeability or conductivity compatible with interesting capacities of treatment in the dynamic zone (1) for a given fluid.

On the other hand, such an oriented structure (10) provides a good horizontal or vertical spreading of the particulate material hold-up ($\epsilon_s^p$) coming from the fluid treated and from the biomass ($\epsilon_s^b$) growing in the structure (10). For example, in a vertically oriented structure (10) operated in a percolating mode, and provided that the materials and the operating conditions are chosen so to help the transfer of the dissolved elements between the static zones (2) and the dynamic zones (1), the biomass will first have a tendency to grow inside the static zones ($\epsilon_L^s$) or at the junction of the static and dynamic zones where the shearing forces are less present or absent. By allowing a better vertical repartition of the solid material accumulated ($\epsilon_s^p$) or neo-formed ($\epsilon_s^b$), such operating conditions thus enhance a long term maintenance of the gaseous hold-up all over the height of the trickling bed and a better circulation of the gaseous or liquid fluids.

Moreover, an oriented structure according to the invention, may present a humidity level, associated with the static liquid hold-up ($\epsilon_L^s$) sufficient to maintain a catabolic activity during a shutdown period of the reactor thereby enhancing a reduction of the accumulated biomass ($\epsilon_s^b$). Upon restarting the operation, the biomass will rapidly resume its anabolic activity, since the biomass is not in a dehydrated state causing the death of micro-organisms or their transformation into a resistant form.

The juxtaposition of layers (16, 18) preferably comprises layers of a first material (16) having a first porosity alternating with layers of a second material (18) having a second porosity.

The first material (16) is preferably a fibrous material, more preferably it is a fiber textile, and most preferably a geotextile is chosen. The geotextile preferably has a porosity of approximately 95 to 97% and is composed of slightly consolidated polypropylene fibres.

The second material (18) is preferably a particulate material selected from the group consisting of sand and peat. Most preferably, it is peat moss having a Von Post between H2 and H5.

Figure 5:
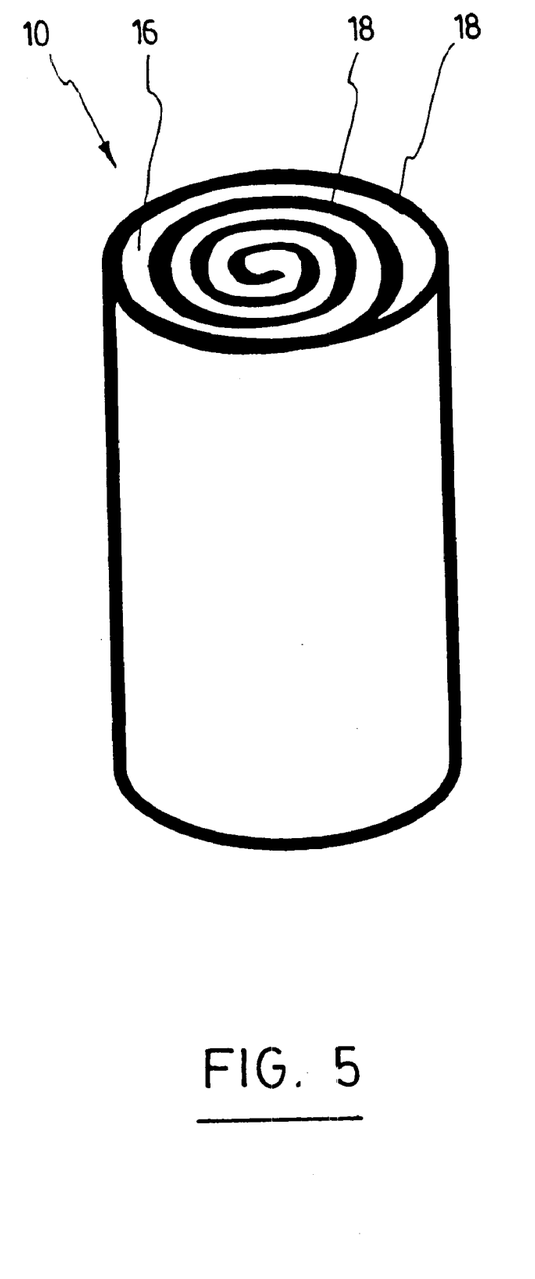
FIG. 5 is a schematic perspective view of an oriented structure according to a further preferred embodiment of the invention.
Figure 6A:
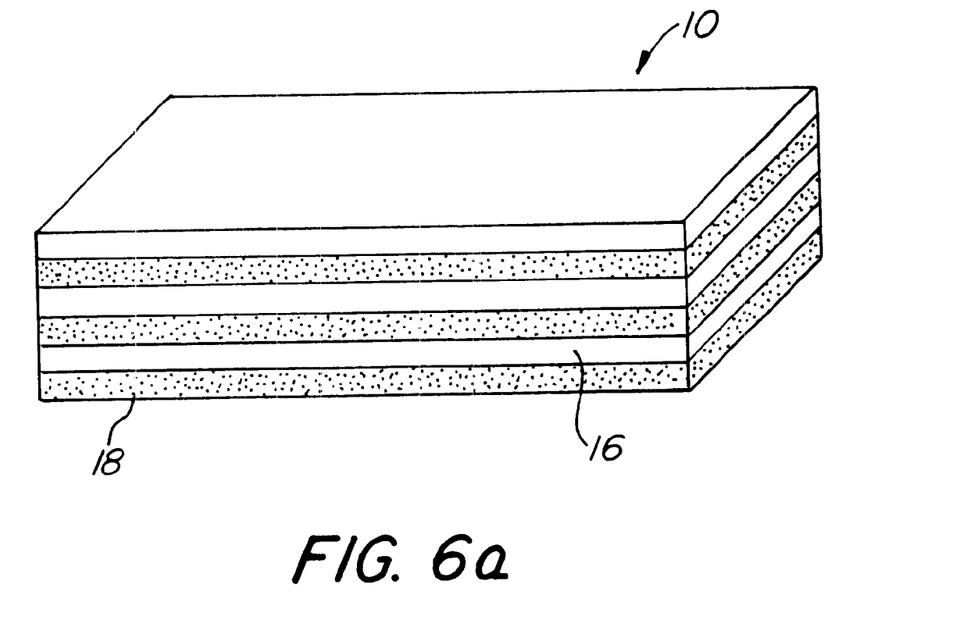
FIGS. 6a) and 6b) are schematic perspective views of still further preferred embodiments of the invention.
Figure 6B:
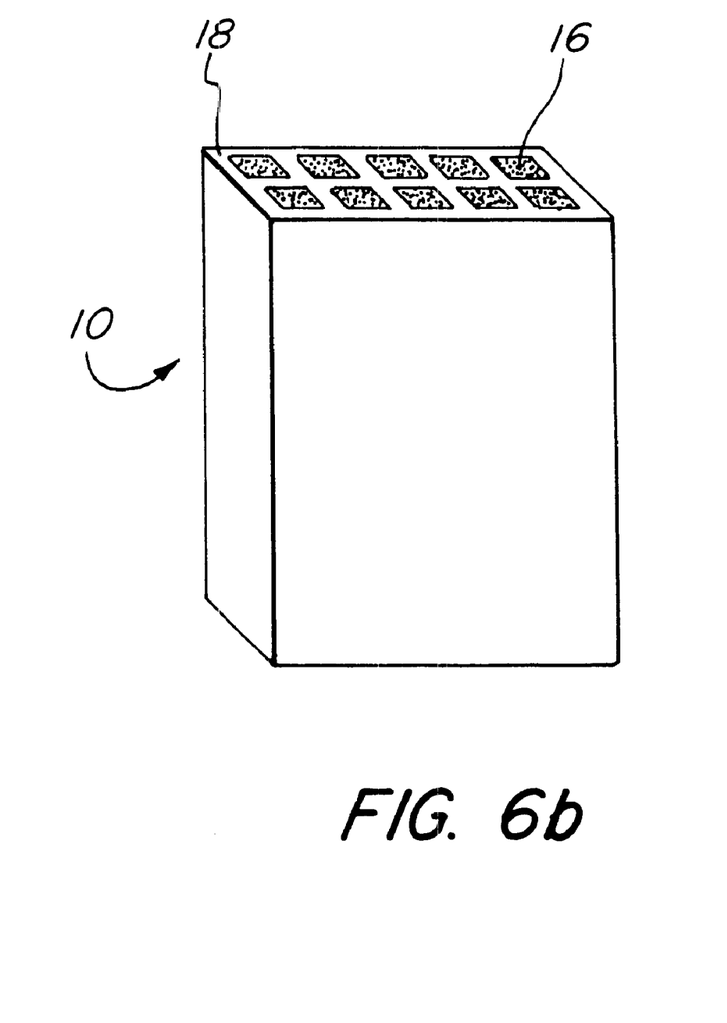

Referring now to FIGS. 5, 6a) and 6b), the manufacture of oriented structures (10) made by the alternation or inclusion in a given plan of sections of material having a different porosity can be manufactured in many ways. For example, and in a non-limited manner, three examples of manufacturing processes are described below.

Referring to FIG. 5, the juxtaposition of layers (16, 18) of porous material can take the form of a roll of a first material (16) having a first porosity, preferably a mat of geotextile, with a second material (18) having a second porosity, preferably a particulate material such as peat or sand. Such a vertical filtration or biofiltration structure (10) made of juxtaposed layers (16, 18) can be manufactured by rolling up a mat of textile fibre, such as a geotextile, previously covered with a uniform layer of a particulate material such as sand or peat. Once the rolling-up is completed and strengthened, the roll thus formed can be used in a vertical position, either in a percolation mode or in a submerged mode, as shown in FIGS. 1a) to 1c).

Alternatively, the roll can be manufactured by providing two mats of a first porous material, for example two mats of geotextile, and providing a second porous and particulate material, for example a peat. Then a multilayer structure is formed by covering one of the mats of geotextile with a layer of the second material and then covering the layer of the second material with the other mats of geotextile. The multilayer thus formed is roll up to form the roll.

Preferably, the two mats of geotextile are attached to each other, by means of tacks, by needled-punch or any other means known in the art.

Also alternatively, a roll according to the invention can be manufactured by rolling up together mats of fibrous material having different porosity. For example, a first geotextile with a first porosity can be rolled up with a geotextile having a second porosity.

Referring to FIG. 6a), another mode of realisation consists in the pilling up, in a reservoir or any given container (the reservoir is not illustrated in the figure), of layers of sand or peat (18) alternating with layers of textile (16), preferably a geotextile. Such filtration or biofiltration structure is preferably devised to be operated horizontally in a submerged mode, as in FIG. 2.

Alternatively, the structure can be obtained by pilling up layers of textile having different porosity.

A further mode of realisation shown in FIG. 6b) rests on the inclusion, in a mass of particulate material (18), such as sand or peat, of sections (16) of different shapes of material having a greater porosity than the porosity of the particulate material. One will note that such oriented structure (10) can be operated vertically or horizontally.

Otherwise, no matter the mode of realisation chosen, at least one self-supporting material, in a given plane, can increase the resistance to the compaction phenomena often observed in filtration or biofiltration bed. With time, compaction might significantly reduce the gaseous hold-up of the bed and consequently, its oxidation capacity. In the same manner, the selection of at least one less expensive material, most of the time in bulk, can help reducing significantly the manufacturing costs.

Figure 7:
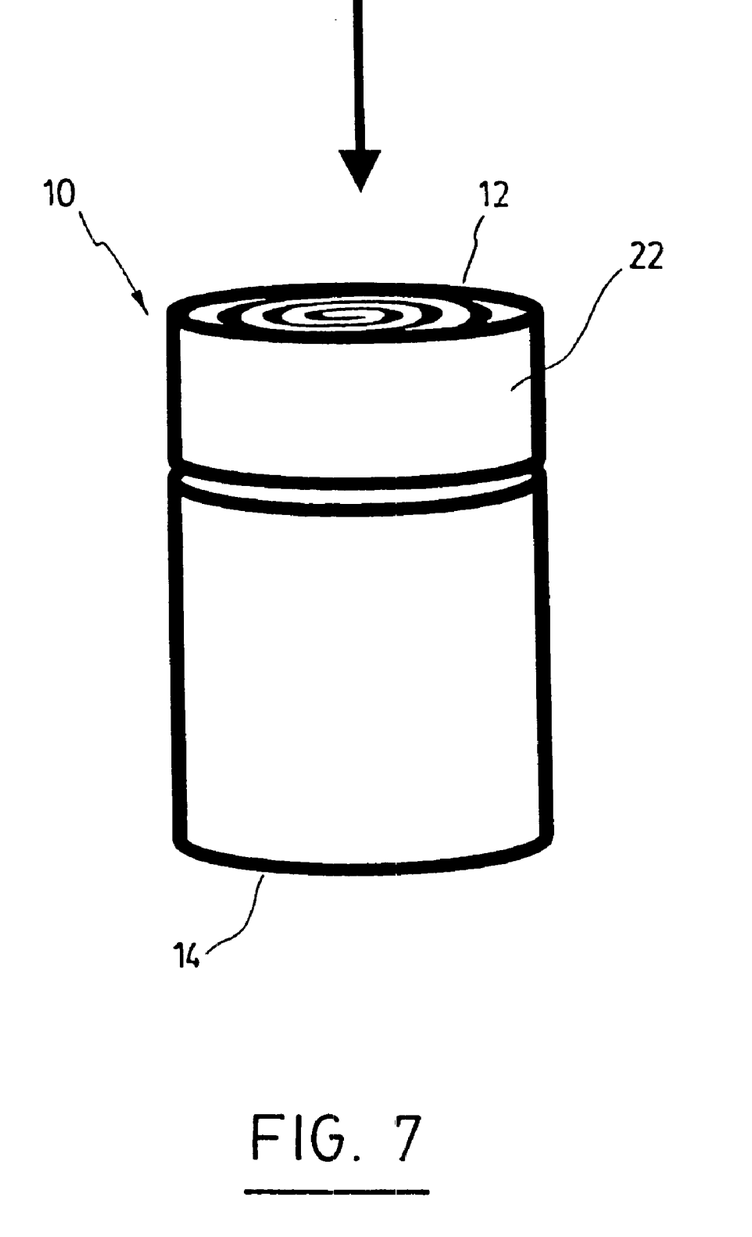
FIG. 7 is another perspective view of the oriented structure shown in FIG. 5 showing how a sacrificial maintenance can be performed by removing an upper section of the roll.

Other manufacturing strategies can also be retained aiming at the replacement of part(s) of the oriented structure (10) or aiming at increasing its capacity to accumulate solids ($\epsilon_s^p$ and $\epsilon_s^b$). As illustrated in FIG. 7, a sacrificial maintenance can be realised, for example, by cutting into two sections a vertical structure made by rolling-up. As the solids tend to accumulate more in the upper part (22) of the oriented structure (10), the replacement of the upper part (22), as shown in FIG. 7, allows a better use of the lower part by increasing its useful lifetime. A sacrificial maintenance can also be realised by manufacturing at first a stack of at least two rolls of a vertical structure and then removing the upper most roll of the stack.

Figure 8:
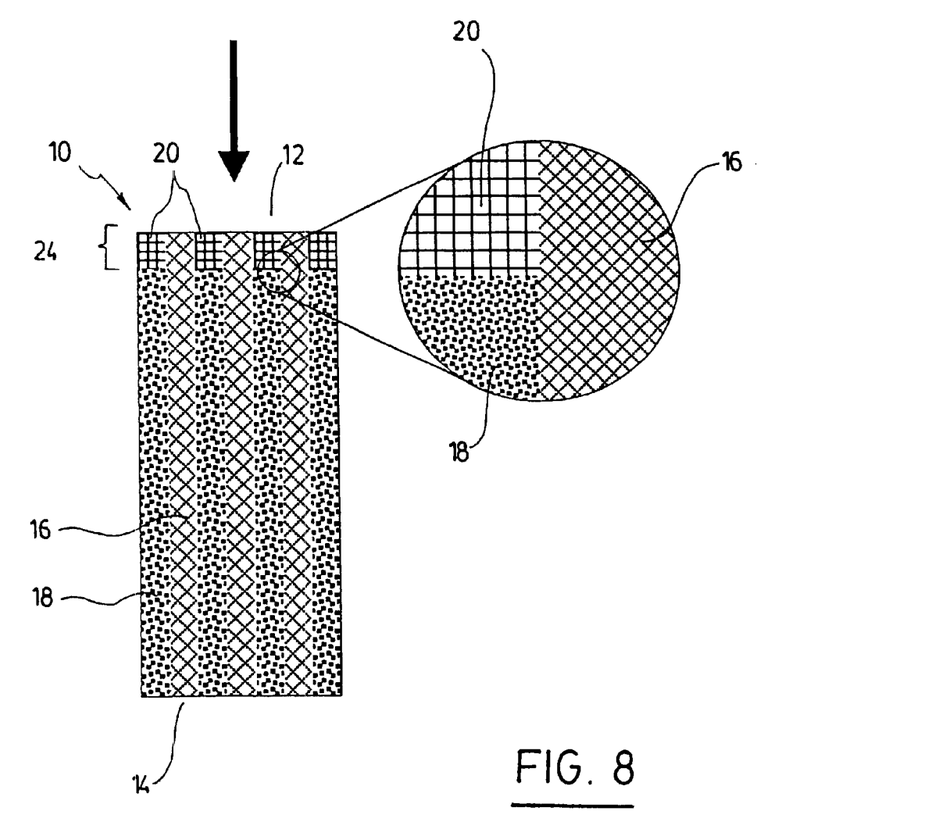
FIG. 8 is a side elevational schematic view of an oriented structure according to a still further preferred embodiment provided with an inlet zone having a differential of porosity, as best shown in the enlarged circle.

Turning now to FIG. 8, the capacity to accumulate the solids can be increased by using a differential of porosity and porometry in the inlet zone (24) of the layers. Thus according to a preferred aspect of the invention, the oriented structure (10) comprises an inlet zone located at the top side of the structure (10). The inlet zone (24) comprises a juxtaposition of layers of a third porous material (20) alternating with layers of the first material (16), each layer of the third material (20) topping a layer of the second material (18) and each layer of the first material (16) in the inlet zone (24) being an extension of a layer of the first material (16). The third material (20) is preferably more porous than the first and second material (16, 18).

For example, the use of a thin zone of highly porous material above the material which enhances the static hold-up allows an increase in the capacity to accumulate solids ($\epsilon_s^p$ and $\epsilon_s^b$) in the upstream part of the reservoir.

Figure 9:
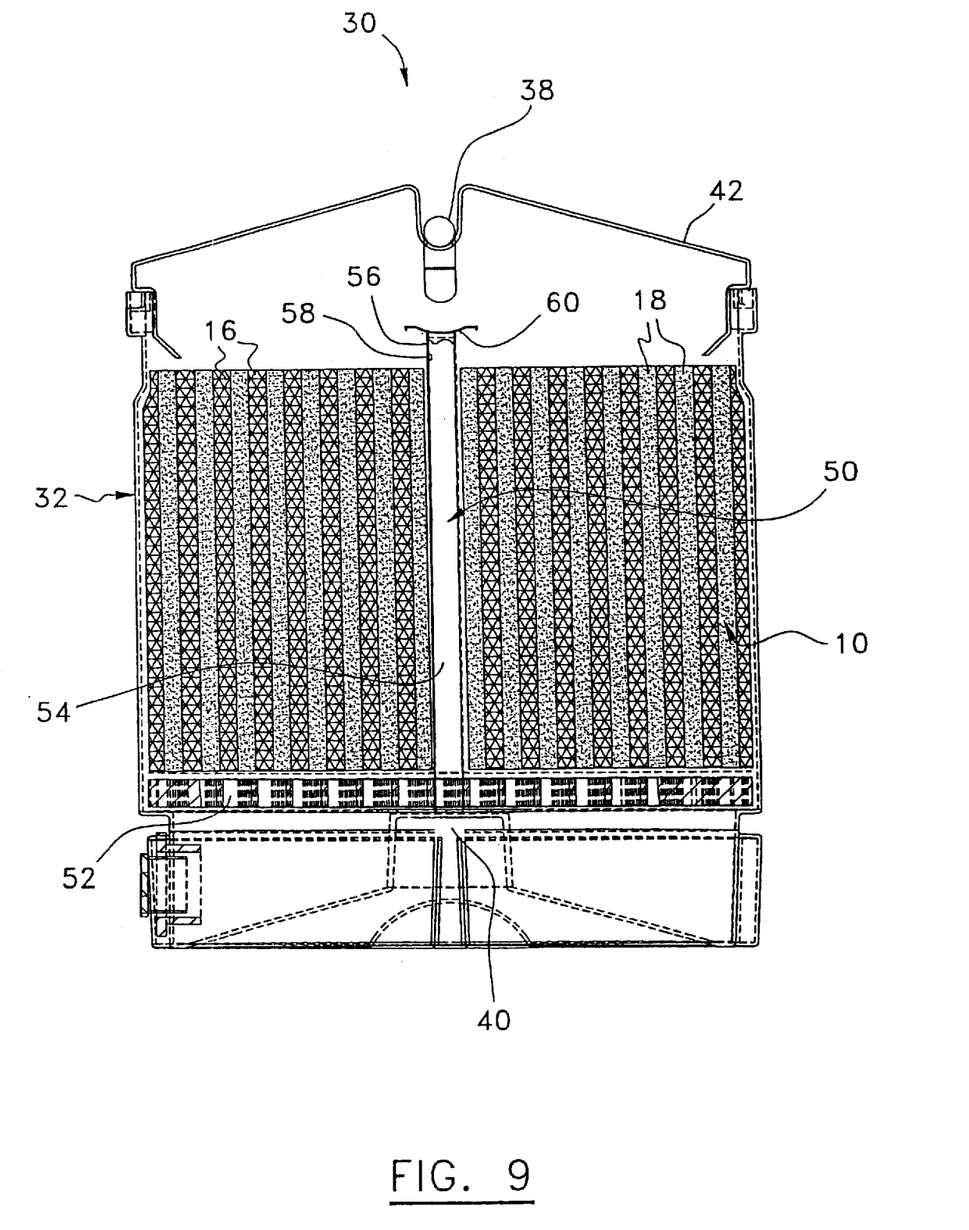
FIG. 9 is a cross-sectional side view of a reactor according to the invention.

A reactor (30) for filtering a liquid embodying features of the invention is illustrated in FIG. 9. The reactor (30) comprises a chamber (32) with an upper portion and a lower portion. A liquid inlet (38) is provided in the upper portion for introducing in the chamber (32) a liquid to be filtered and a liquid outlet (40) is provided in the lower portion for discharging from the chamber (32) a filtered liquid.

At least one oriented structure (10) as defined above is mounted within the chamber (32). Each layer (16, 18) of the oriented structure (10) is spanning generally vertically within the chamber (32) so that the general flowing direction of the liquid in the chamber (32) is parallel to the layers (16, 18).

Although the oriented structure (10) used in the reactor (30) can take many of the forms described above, the oriented structure (10) in the form of a roll, as the one shown in FIG. 5, is preferred. Most preferably, a single roll sized to fill up the chamber is used. In that case, the chamber (32) is cylindrical.

The reactor (30) preferably has an open top and a removable cover (42) for closing the open top, the liquid inlet (38) being located in the cover (42). In order to facilitate maintenance of the reactor (30), the oriented structure (10) may advantageously be mounted on a supporting structure (50) removable from the chamber (32), thereby allowing a used structure (10) to be easily removed from the chamber (32) for replacement purposes.

Preferably, the supporting structure (50) comprises a disk-shaped base plate (52) mountable within the chamber (32) and an upright rod (54) around which the layers of the oriented structure (10) are rolled up. The rod (54) is extending upwardly from the centre of the base plate (52) and has a top end (56) protruding from the roll whereby the oriented structure (10) is removable from the chamber (32) by pulling on the top end (56) of the supporting structure (50).

The rod (54), which is preferably hollow, comprises an air inlet (58) provided near the top end (56), or at the top end, of the rod (54) for allowing aeration of the oriented structure (10).

The base plate (52) can be made of any rigid material capable of supporting the roll, such as steel.

Also preferably, a splash plate (60), a nozzle or any other distribution device is mounted at the top end (56) of the rod (54). The cover (42) is designed so that the liquid inlet (38) be located just above the splash plate (60), thereby allowing the liquid dripping from the liquid inlet and falling on the splash plate (60) to be distributed all over the oriented structure (10).

Figure 10:
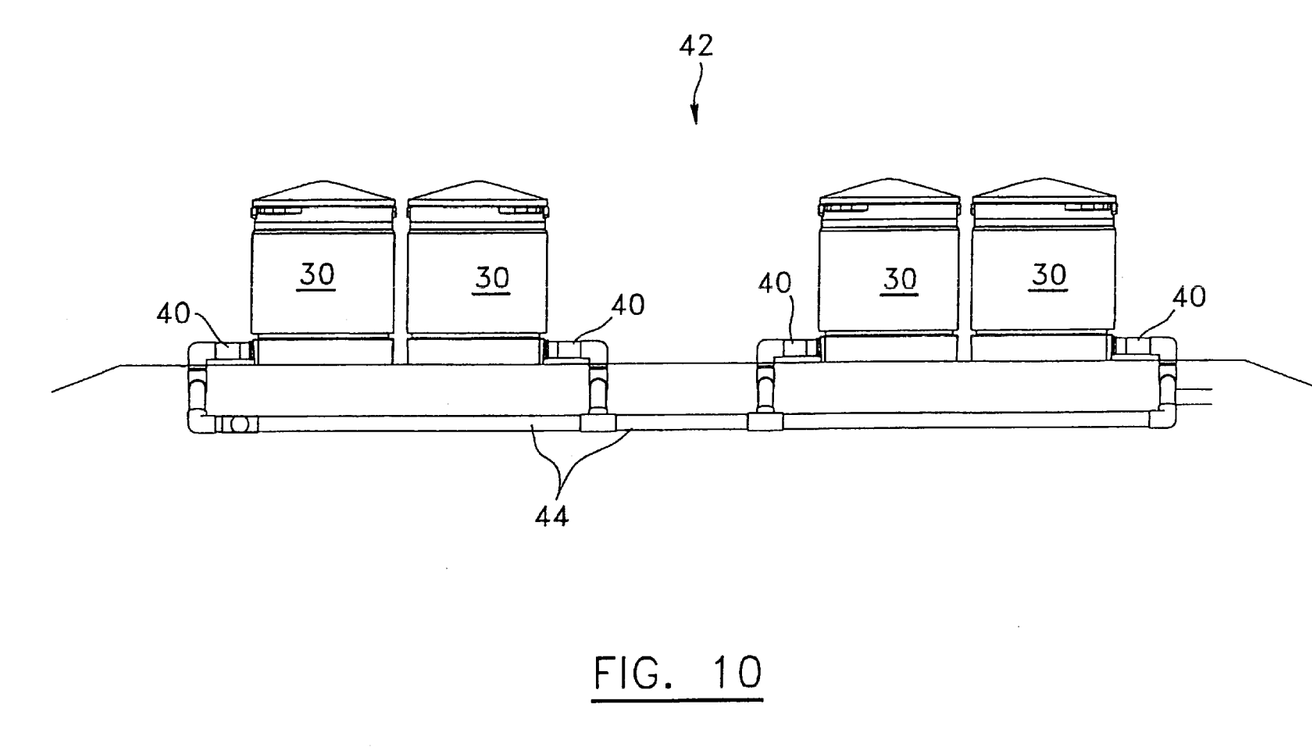
FIG. 10 is side elevation view of a plant embodying a plurality of reactors according to the invention.

The reactor (30) can be used alone or in combination with other similar reactors (30) in a treatment plant (42), as shown in FIG. 10. In this case, the liquid outlets (40) of each reactor (30) can be linked all together by means of a discharged pipe (44) extending horizontally under the reactors (30).

EXAMPLES

The two following examples illustrate the interest of an oriented biofilter structure formed with the vertical alternation of peat zones where the static hold-up effect dominates, and of textile fibre zones where dynamic hold-up effect dominates. In both cases, the oriented structure has been manufactured by rolling-up.

The first Table allows to compare the treatment capacity of a filtering bed composed of 100% of peat with the treatment capacity of an oriented structure composed of the vertical alternation of peat zones and non-woven textile fibre zones. Both reactors have been used for the treatment of waste water and have been operated in a percolating mode during three months.

TABLE 1

Comparison between the treatment capacity of an oriented vertical filter structure according to the present invention and 100% peat bed.

| Parameters | 100% peat bed | Structure of textile fibre and peat |
|---|---|---|
| Treatment capacity (kg treated matter/m$^2$)* | 9 | 45 |

*Dissolved matter and particulate matter (BOD$_5$ and TSS)

For comparable treatment efficiencies, the vertical oriented structure shows a treatment capacity 4 to 5 times greater than the treatment capacity of the 100% peat bed.

Table 2 shows the effect of the presence of the static zones (peat layers) in a biofiltration structure having a height of 40 cm formed by rolling-up a mat of non-woven textile fibre, and operated vertically in a percolating mode. In such a case, the effluent treated was a landfill leachate containing from 200 to 250 mg/L of BOD$_5$, from 100 to 150 mg/L of NH$_4$ and from 60 to 100 mg/L of TSS.

TABLE 2

Comparison of the average treatment efficiencies for filter bodies composed of geotextile rolled up vertically with or without peat zones

| Parameters | With static hold-up zones made of peat | Without static hold-up zones made of peat | Difference |
|---|---|---|---|
| % removal of BOD$_5$ | 71(15) | 49(13) | 31% |
| % nitrification of NH$_4$ | 45(10) | 34(9) | 25% |
| % removal of TSS (total suspended solid) | 34(6) | 10(9) | 71% |
| % removal of coliforms | 75(3) | 48(3) | 36% |
| % removal of iron | 49(6) | 35(6) | 29% |
| % removal of zinc | 38(6) | 19(6) | 50% |

() number of values included in the average

The incorporation of the layers of peat alternating with the layers of textile fibers allowed an increase in the efficacy of the main parameters evaluated.

What is claimed is:

1. An oriented structure for treating a fluid, the structure comprising:

an inlet end for receiving a fluid to be treated and an outlet end opposite the inlet end and from which a treated fluid is discharged, the fluid being allowed to flow into the structure from the inlet end to the outlet end defining a flowing direction;

a juxtaposition of layers of porous material having a different porosity, each layer spanning from the inlet end to the outlet end of the structure whereby in use the layers are oriented generally parallel to the flowing direction of the fluid, wherein the juxtaposition of layers comprises layers of a first material having a first porosity chosen so as to create a zone of dynamic hold-up of the fluid alternating with layers of a second material having a second porosity chosen so as to create a static hold-up of the fluid, thereby promoting internal exchanges of the fluid between the zone of dynamic hold-up and the zone of static hold-up.

2. An oriented structure as claimed in claim 1, wherein the juxtaposition of layers of porous material is in the form of a roll of said first material with said second material.

3. An oriented structure as claimed in claim 1, wherein the first material is a fibrous material.

4. An oriented structure as claimed in claim 3, wherein the first material is a geotextile.

5. An oriented structure as claimed in claim 1, wherein the second material is a particulate material.

6. An oriented structure as claimed in claim 5, wherein the second material is selected from the group consisting of sand and peat.

7. An oriented structure as claimed in claim 1, wherein the layers of porous material are vertically oriented.

8. An oriented structure as claimed in claim 7, comprising a top side and a bottom side, the top side being the inlet end and the bottom side being the outlet end.

9. An oriented structure as claimed in claim 8, comprising an inlet zone located at the top side of the structure, the inlet zone comprising a juxtaposition of layers of a third porous material alternating with layers of the first material, each layer of the third material topping a layer of the second material and each layer of the first material in the inlet zone being an extension of a layer of the first material.

10. An oriented structure as claimed in claim 9, wherein the third material is more porous than the first and second material.

11. An oriented structure for treating a liquid, the structure comprising:

a top side opposite a bottom side;

an inlet in the top side for receiving a liquid to be treated and an outlet in the bottom side from which a treated liquid is discharged, the liquid being allowed to flow into the structure from the inlet to the outlet defining a flowing direction;

a vertical juxtaposition of layers of fiber textile alternating with layers of peat, each layer spanning from the top side to the bottom side of the structure whereby in use the layers are oriented generally parallel to the flowing direction of the liquid.

12. A reactor for treating a liquid, the reactor comprising:

a chamber with an upper portion and a lower portion;

a liquid inlet in the upper portion for introducing in the chamber a liquid to be treated and a liquid outlet in the lower portion for discharging from the chamber a treated liquid; and at least one oriented structure for treating a fluid mounted within the chamber, said oriented structure comprising a juxtaposition of layers of porous material having a different porosity, each layer spanning generally vertically within the chamber;

wherein the juxtaposition of layers comprises layers of a first material having a first porosity chosen so as to create a zone of dynamic hold-up of the fluid alternating with layers of a second material having a second porosity chosen so as to create a static hold-up of the fluid, thereby promoting internal exchanges of the fluid between the zone of dynamic hold-up and the zone of static hold-up.

13. A reactor as claimed in claim 12, wherein the juxtaposition of the at least one oriented structure comprises layers of geotextile alternating with layers of peat.

14. A reactor as claimed in claim 13, wherein the at least one oriented structure is in the form of a roll obtained by rolling up a multilayer structure including a layer of peat sandwiched between two mats of geotextile.

15. A reactor as claimed in claim 14, comprising only one of said roll sized to fill up the chamber.

16. A reactor as claimed in claim 15, having an open top and a removable cover for closing the open top, the liquid inlet being located in the cover.

17. A reactor as claimed in claim 16, wherein the oriented structure is mounted on a supporting structure removable from the chamber.

18. A reactor as claimed in claim 17, wherein the chamber is cylindrical and the supporting structure comprises a disk-shaped base plate mountable within the chamber and an upright rod around which the layers of the oriented structure are rolled up, the rod extending upwardly from the centre of the base plate and having a top end protruding from the roll whereby the oriented structure is removable from the chamber by pulling on the top end of the supporting structure.

19. A method for manufacturing an oriented structure for treating a fluid, comprising the steps of:

a) providing two mats of a first porous material having a porosity chosen so as to create a zone of dynamic hold-up of the fluid and a second porous material made of particles having a porosity chosen so as to create a static hold-up of the fluid;

b) forming a multilayer structure by covering one of said two mats with a layer of the second material and covering the layer of the second material with the other one of said two mats; and c) rolling up the multilayer structure.

20. A method as claimed in claim 19, wherein the first material is a geotextile and the second material is peat.

* * * * *